United States Patent [19]

Jönsson et al.

[11] Patent Number: 5,746,493
[45] Date of Patent: May 5, 1998

[54] LIGHT GUIDE FOR A DISPLAY OR KEYBOARD

[75] Inventors: Anders Jönsson, Durham, N.C.; Mats Wictor, Lund, Sweden

[73] Assignee: Ericsson Inc., Research Triangle Park, N.C.

[21] Appl. No.: 610,602

[22] Filed: Mar. 8, 1996

[51] Int. Cl.⁶ ............................. F21V 7/04; G01D 11/28; H04M 1/22
[52] U.S. Cl. ........................... 362/31; 362/23; 362/24; 362/26
[58] Field of Search ........................... 362/31, 23, 24, 362/26, 27, 29, 86, 88, 800

[56] References Cited

U.S. PATENT DOCUMENTS

| | | | |
|---|---|---|---|
| 2,699,141 | 1/1955 | Gaguski | 362/26 |
| 2,900,949 | 8/1959 | Baker | 362/26 |
| 3,774,021 | 11/1973 | Johnson. | |
| 3,892,959 | 7/1975 | Pulles | 362/31 |
| 4,124,879 | 11/1978 | Schoemer | 362/24 |
| 4,918,577 | 4/1990 | Furudate | 362/26 |
| 5,053,928 | 10/1991 | Pasco | 362/24 |
| 5,083,240 | 1/1992 | Pasco | 362/24 |
| 5,130,897 | 7/1992 | Kuzma | 362/24 |
| 5,537,300 | 7/1996 | Kraines et al. | 362/86 |

FOREIGN PATENT DOCUMENTS 2 285 518   10/1995   United Kingdom.

Primary Examiner—Ira S. Lazarus
Assistant Examiner—Matthew Spark
Attorney, Agent, or Firm—Burns, Doane, Swecker & Mathis, L.L.P.

[57] ABSTRACT

A light guide for illuminating a display and/or keyboard device is formed from translucent material as a planar element having a peripheral edge. A plurality of arcuately shaped light coupling recesses are formed on one side to transmit light from light sources substantially uniformly into the light guide. A plurality of light reflecting recesses are formed in the peripheral edge to reflect light at the edge back into the light guide in a manner useful for illuminating the keys of the device.

17 Claims, 3 Drawing Sheets

LIGHT GUIDE FOR A DISPLAY OR KEYBOARD

The present invention is directed to devices having lighted displays and keyboards, for example, cellular telephones. More particularly, the invention is directed to light guides that transmit, distribute, and diffuse light for illuminating a display and keyboard in a device.

BACKGROUND AND SUMMARY

A light guide or light conductor used to transmit light for illuminating a display and keyboard in a device typically is formed as a planar element of translucent material. A light guide is generally positioned as a layer on one side of the device's display panel and keyboard. Light sources, typically LEDs, are positioned along an edge of the light guide and light transmitted into it is diffused and distributed by the light guide to the display and keyboard.

A problem in conventional light guides is that light is not distributed uniformly, and the display panel and keys are accordingly not uniformly illuminated. Bright and dark areas thus result in the display and keys, which detracts from the appearance of the device.

This problem is related in part to the manner in which the light sources are positioned and/or coupled to the light guide. Conventionally, light sources are simply positioned along an edge of the light guide for the display panel and additional lights sources positioned in holes located in the interior of the light guide near the key holes. Light from the sources on the edge of the light guide is not uniformly transmitted across the edge of the light guide.

The problem is also related to how light exiting the light guides is handled at the edges. Light that strikes the edges is in part lost through the edge and in part reflected back in the light guide in a way that does not provide much useful illumination.

The present invention provides a light guide that overcomes the deficiencies in the art. A light guide in accordance with the invention distributes light to a display and keyboard in a more uniform manner that substantially eliminates dark and bright areas. The light guide of the invention more provides a light source coupling to receive and transmit light more efficiently into the light guide, thus, more effectively distribute light throughout the light guide. Accordingly, a light guide of the invention provides a brighter display and keys, and may require fewer light sources than conventional light guides. The light guide may thus saves manufacturing expense and time, component cost, and reduces battery energy consumption in the completed device.

According to the invention, a light guide comprises an element formed of a translucent material having an upper surface, a lower surface and a peripheral edge. The element is preferably a planar, rectangular component shaped to correspond to the keyboard and display of a telephone. The light guide, of course, may be shaped to conform with any display or keyboard, as the principles of the invention apply equally as well to any conveniently shaped light guide.

According to the invention, a plurality of light coupling recesses is provided on the peripheral edge to transmit light into the light guide. The light coupling recesses are preferably arcuately shaped, and more preferably semicircular. This feature helps to guide light from light sources uniformly into the light guide, thus avoiding bright and dark regions. In a preferred embodiment of the invention, the light coupling recesses are positioned on one side of the light guide in equally spaced relationship. In this way, a maximum amount of useful light is transmitted to illuminate a desired portion of the light guide, for example, that portion serving as a display screen backing. Alternatively, the light coupling recesses may be positioned as convenient around the periphery of the light guide for a desired illumination pattern.

According to another aspect of the invention, a plurality of reflecting recesses are provided on the peripheral edge of the light guide to reflect light striking the edge toward the key holes. According to a preferred embodiment of the invention, the reflecting recesses are positioned between adjacent holes. The reflecting recesses may be arcuately shaped or formed with two or more facets. According to a preferred embodiment, the reflecting recesses are V-shaped.

According to yet another aspect of the invention, the upper and lower surfaces of the element may be formed as glossy reflective surfaces, which facilitates the transmission of light through the light guide while minimizing the leakage of light from the surfaces. Alternatively, one or both of the surfaces of the light guide at the display screen backing may be formed as a matt or roughened surface to diffuse light toward the display. Preferably, the bottom surface of the display backing area, that is, the side opposite from the display panel, is formed for diffusion of light.

BRIEF DESCRIPTION OF THE DRAWINGS

The invention may be more fully understood through the following description in conjunction with the appended drawings, in which.

DETAILED DESCRIPTION

Figure 1:
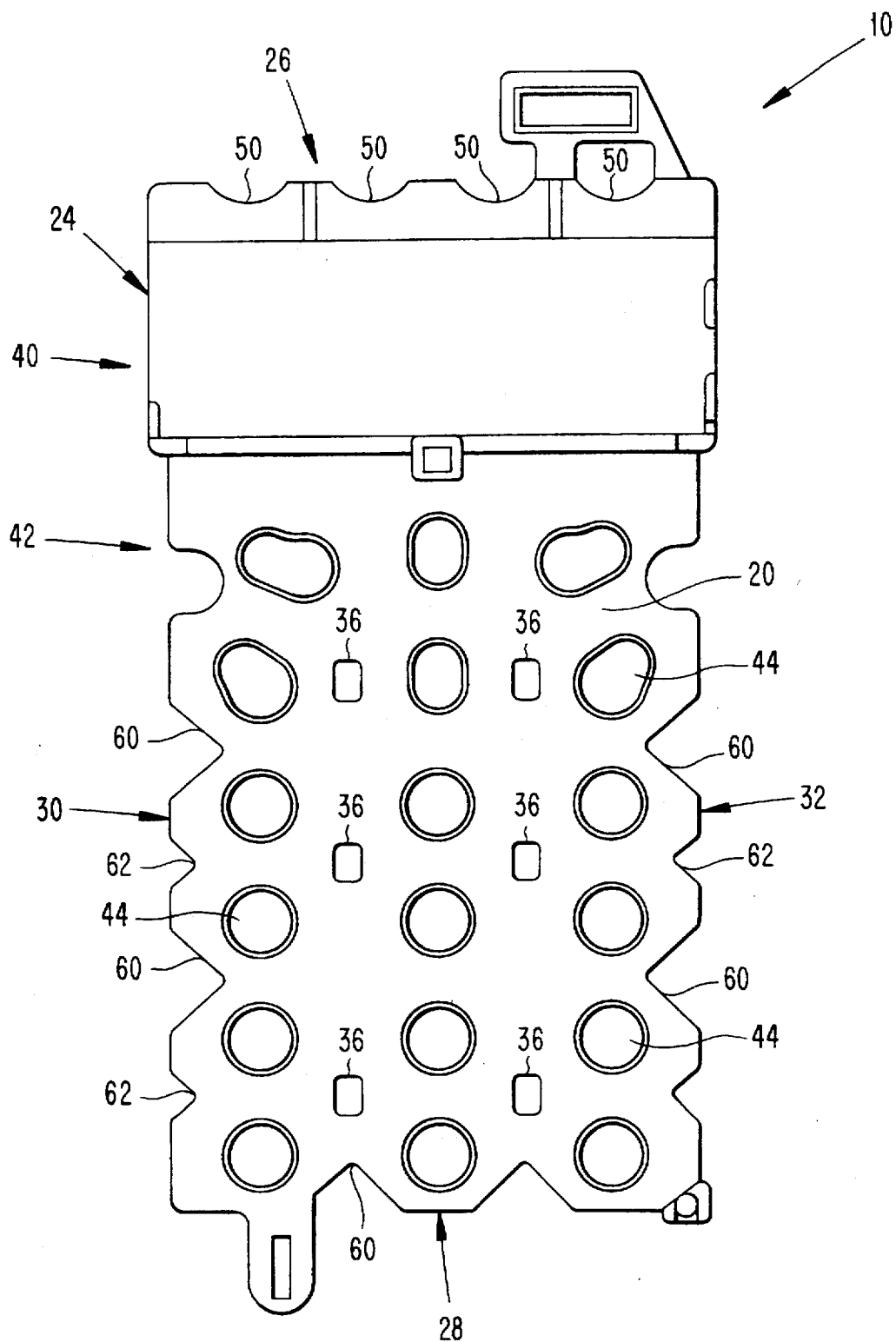
FIG. 1 is a top view of a light guide in accordance with the invention.

FIG. 1 illustrates a top view of a light guide 10 in accordance with the invention. The light guide 10 is formed of a translucent plastic material capable of transmitting light. As illustrated, the light guide is substantially rectangular and planar in shape, having a top surface 20, a bottom surface 22 (illustrated in FIG. 3), and is enclosed by a peripheral edge 24. The peripheral edge 24 in the illustrated rectangular element 10 is defined by opposite end edges, 26, 28, and opposite side edges 30, 32. The illustrated light guide 10 is intended to illuminate the display panel and keypad of a cellular telephone (illustrated in exploded view in FIG. 5), and thus is shaped to conform to the shape requirements of that device. The principles of the invention, as will become further understood by the description below, apply equally as well to any convenient shape for a light guide. The description using the appended figures should be considered illustrative and not restrictive.

A first portion 40 of the light guide 10 adjacent to the first end edge 26 comprises a display panel backing. Light distributed to the first portion 40 illuminates a display panel of the device. A second portion 42 comprises a keyboard portion having a plurality of key holes 44. The light guide 10 includes a plurality of light source holes 36 positioned between the rows of key holes 44. Light sources, for example, LEDs, may be positioned in the light source holes 36 to provide light for the second portion 42 of the light guide. Light distributed in this portion 42 illuminates the key holes 44 and keys positioned therein (please refer to FIG. 5).

Figure 2:
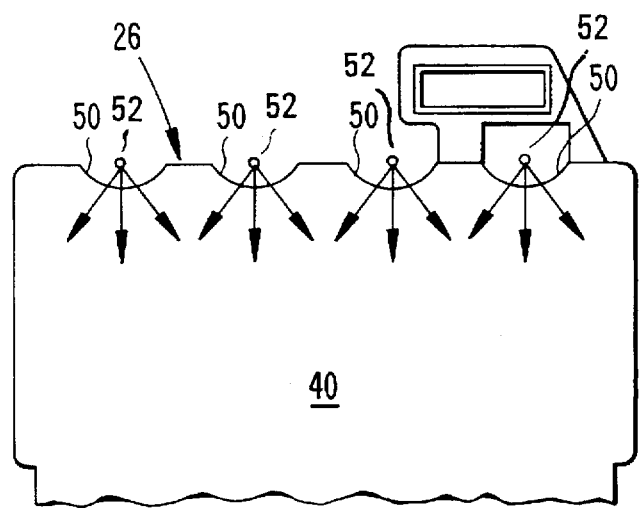
FIG. 2 is a partial view of a screen backing portion of the light guide of FIG. 1.

FIG. 2 is a partial view of the first portion 40 of the light guide 10. On the first edge 26, a plurality of light coupling recesses 50 are formed. The light coupling recesses 50 are arcuately shaped to transmit light from a light source 52 positioned near each recess substantially uniformly into the light guide 10, as indicated by the arrows emanating from each source 52. The light coupling recesses 50 may be formed as semi-elliptical or semicircular. The light sources 52 are illustrated as point sources and the light as rays for simplicity. In a device, the light sources 52 may be LEDs or other suitable devices. In conventional light guides, light sources are positioned along a straight edge, which because of refraction at the edge, create non-uniform light streaks, that is, bright and dark regions in the light guide. The light coupling recesses 50 of the invention avoid this difficulty by presenting curved indented edge portions that reduce undesirable diffraction at the light coupling, and permit light from the light sources to be more uniformly transmitted into the light guide 10.

Figure 4:
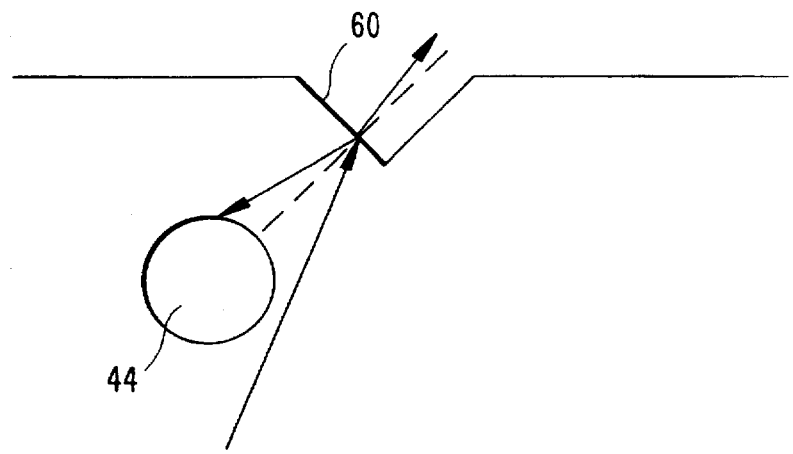
FIG. 4 is a schematic view of a light reflecting recess and a key hole.

Referring again to FIG. 1, a plurality of light reflecting recesses 60, 62 are formed on the second end edge 28 and the side edges 30, 32. The light reflecting recesses 60, 62 are formed as V-shaped and are positioned in alignment with spaces between adjacent key holes 42, as shown. The light reflecting recesses 60, 62 may alternatively be arcuately shaped, or may be multifaceted. The light reflecting recesses 60, 62 take advantage of an optical principle relating to light in one medium encountering a boundary with another medium having a different dielectric constant. At such a boundary (e.g., the peripheral edge 24 of the light guide 10), light is both transmitted across the boundary into the second medium and reflected back into the first medium. This is illustrated schematically in FIG. 4 in conjunction with a hole 44 and a reflecting recess 60. The light reflecting recesses 60, 62 of the invention reflect light back into the light guide 10 in a manner useful for illuminating the key holes 44, as illustrated in FIG. 4. In conventional light guides, the edges are typically straight, that is, without light reflecting recesses, and light that is not lost across the edge is generally reflected in a non-useful manner.

Figure 3:
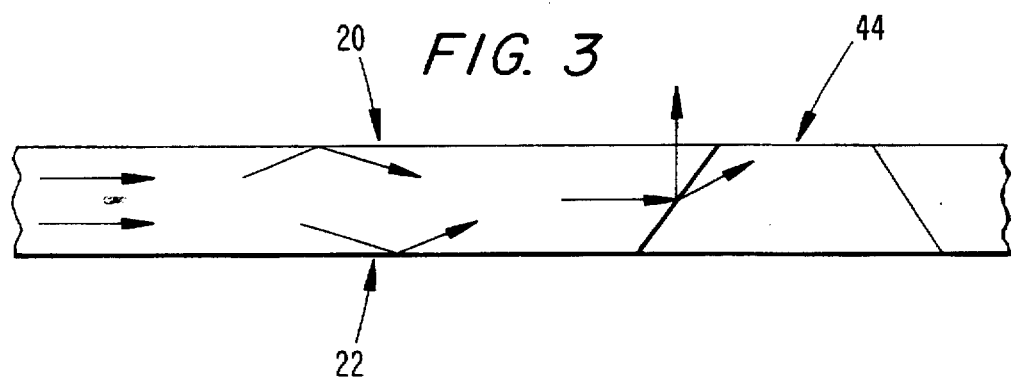
FIG. 3 is a partial side sectional view of the light guide.

FIG. 3 shows a partial sectional view of the light guide including a key hole 44 to illustrate additional features of the invention. According to one aspect, the top 20 and the bottom 22 surfaces are formed sufficiently smooth at least in the key hole area to be reflectively smooth surfaces so that light distributed in the light guide is reflected back into the light guide for further distribution throughout. By contrast, a rough surface would cause diffusion of the light striking the surface. This effect can be advantageously used in the display panel backing portion 40 of the light guide. The bottom surface 22 of the light guide at the display panel backing 40 can be formed rough for diffusion of light to illuminate a display panel mounted adjacent to this portion of the light guide.

Figure 5:
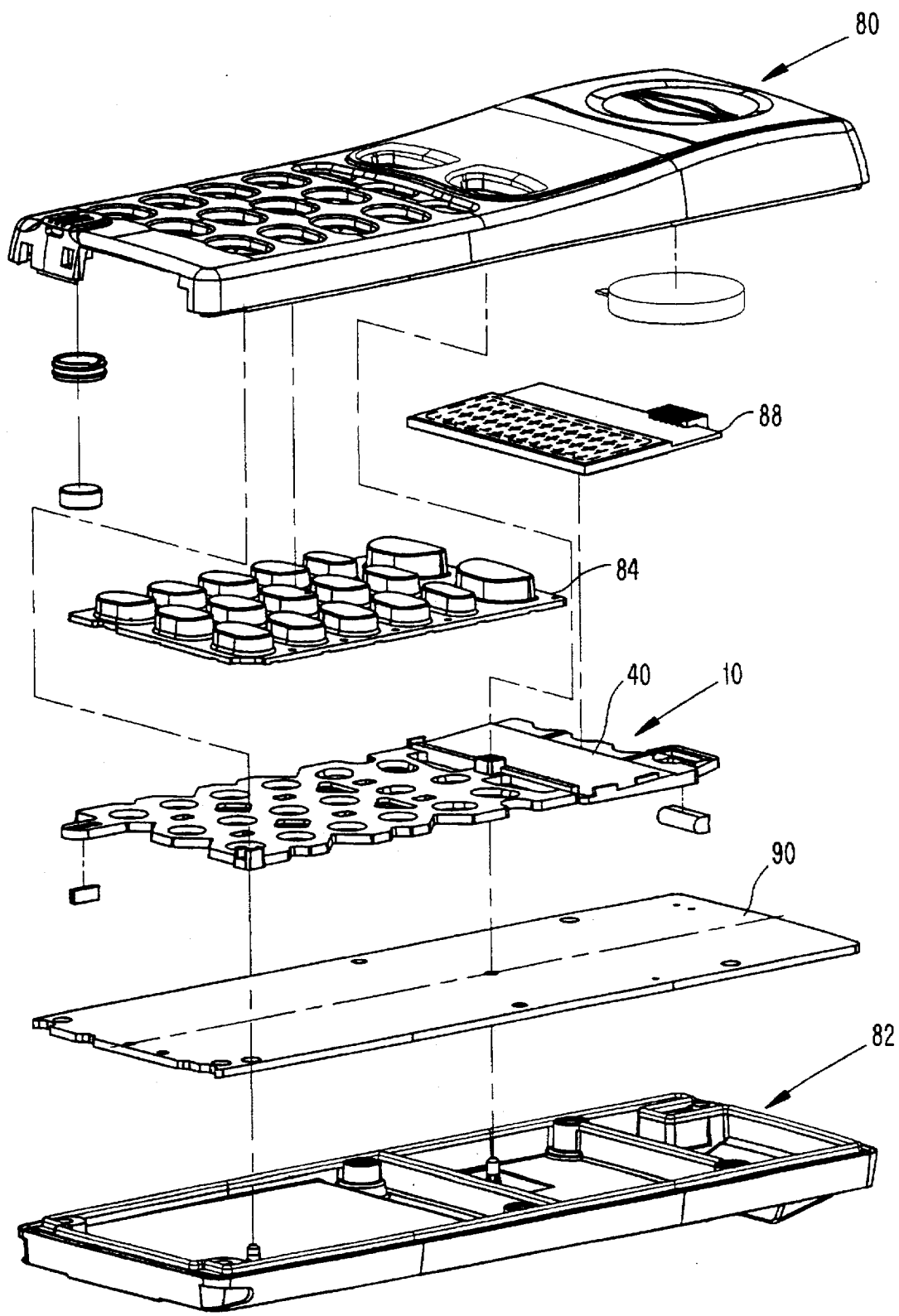
FIG. 5 is an exploded view of a telephone assembly including a light guide in accordance with the invention to illustrate how the light guide is used.

According to another aspect, the key holes 44 are frustoconical in cross section, that is, as a section of a cone, and are oriented so that a lower edge is wider than an upper edge. The light guide 10 in the device illustrated in FIG. 5 is positioned beneath the key pad, so that the top surface 20 of the light guide is adjacent to the keypad. By shaping the key holes 44 in this manner, as shown in FIG. 5, light striking the edge of the key hole 44 is reflected toward the key position to better illuminate the key.

FIG. 5 illustrates in exploded view a light guide 10 according to the invention as part of a telephone assembly to illustrate how the light guide of the invention may be incorporated in a device. The telephone includes a cover 80 and a base 82 that enclose the device. A keypad 84 is positioned to protrude through key holes in the cover 80. The light guide 10 is disposed beneath the keypad 84, and a display panel 88, typically an LC display, is positioned on the screen backing portion 40 of the light guide. A printed circuit board 90 which carries the functional electronics, including the LEDs, is disposed on the base 82 below the light guide 10.

The description of the principles, features, and preferred embodiments of the invention are intended to be illustrative rather than limiting, and changes, modifications and equivalents may be used by others without departing from the scope the invention as defined in the claims.

What is claimed is:

1. A light guide for illuminating a display or keyboard, comprising a substantially translucent element having a substantially rectangular shape with end edges and side edges, and having an upper surface and a lower surface, a first portion of the light guide being a backing screen for a display and a second portion being a keyboard portion having a plurality of keyholes, the light guide having a plurality of light coupling recesses formed on a first end edge adjacent to the first portion, the recesses being arcuately shaped to transmit light substantially uniformly into the light guide.

2. The light guide as claimed in claim 1, wherein the light coupling recesses are semi-circularly shaped.

3. The light guide as claimed in claim 1, wherein the top and bottom surfaces are formed as reflectively smooth surfaces to reflect light in the light guide back into the light guide.

4. The light guide as claimed in claim 1, further having a plurality of reflective recesses formed on the side edges, wherein a portion of light transmitted to the peripheral edge is reflected by the reflective recesses back into the light guide.

5. The light guide as claimed in claim 4, wherein additional light reflecting recesses are formed on a second end edge adjacent the keyhole portion.

6. The light guide as claimed in claim 4, wherein the light reflecting recesses are each positioned in alignment with a space between adjacent key holes.

7. The light guide as claimed in claim 4, wherein the reflective recesses are V-shaped.

8. The light guide as claimed in claim 7, wherein the reflective recesses are arcuately shaped.

9. The light guide as claimed in claim 1, wherein the key holes have a frustoconical shape and are wider at the bottom surface than at the top surface.

10. The light guide as claims in claim 1, wherein the keyholes are arranged in rows, and further comprising a plurality of light source holes in the second portion between the rows of keyholes.

11. A light guide for illuminating a display and keyboard, comprising a substantially translucent element having an upper surface, a lower surface, and end and side peripheral edges, a first portion of the light guide adjacent to a first end edge comprising a backing screen for a display, and a second portion of the light guide having a plurality of holes for keys, the light guide having a plurality of light coupling recesses formed on a first of the end edges, the light coupling recesses being arcuately shaped to transmit light substantially uniformly into the light guide, and a plurality of light reflecting recesses positioned on the opposite end edge and the side edges.

12. The light guide as claimed in claim 11, wherein the light reflecting recesses are V-shaped.

13. The light guide as claimed in claim 11, wherein the light coupling recesses are semi-circularly shaped.

14. The light guide as claimed in claim 11, wherein the light reflecting recesses are each positioned in alignment with a space between adjacent key holes.

15. The light guide as claimed in claim 11, wherein the top and bottom surfaces are formed as reflectively smooth surfaces to reflect light in the light guide back into the light guide.

16. The light guide as claimed in claim 11, wherein the key holes have a frustoconical shape and are wider at the bottom surface than at the top surface.

17. The light guide as claims in claim 12, wherein the holes for keys are arranged in rows, and further comprising a plurality of light source holes in the second portion between the rows of holes.

\* \* \* \* \*